United States Patent
Stoessel et al.

[11] 3,962,849
[45] June 15, 1976

[54] CASTER WHEEL ARM

[75] Inventors: Herman V. Stoessel; Ronald K. Guinn; Bernard L. Wells, all of Wichita, Kans.

[73] Assignee: Hesston Corporation, Hesston, Kans.

[22] Filed: Dec. 5, 1974

[21] Appl. No.: 529,852

[52] U.S. Cl................................. 56/10.2; 56/16.1; 56/DIG. 15
[51] Int. Cl.².......................................... A01D 47/00
[58] Field of Search.................... 56/208, 10.2, 10.4, 56/DIG. 15, 364, 13.5, 14.7, 14.9, 15.8, 15.9, 16.1, 16.4

[56] References Cited
UNITED STATES PATENTS

| | | | |
|---|---|---|---|
| 2,636,335 | 4/1953 | Whitney | 56/364 X |
| 2,638,728 | 5/1953 | Balzer | 56/208 |
| 3,771,302 | 11/1973 | Vogt | 56/364 |

*Primary Examiner*—Louis G. Mancene
*Assistant Examiner*—J. N. Eskovitz
*Attorney, Agent, or Firm*—Schmidt, Johnson, Hovey & Williams

[57] ABSTRACT

The windrow pickup header of a forage harvester is supported at least in part by gauging means that senses rises and falls in the terrain in front of the header to swing the latter up and down to accommodate such unevenness in the terrain. Long, generally fore-and-aft extending arms on opposite sides of the header have caster wheels at the forwardmost, free ends thereof and have inturned sections at their opposite ends which are fixed to the header adjacent the top of the latter and spaced substantially above the swinging axis of the header so that any rearwardly directed force applied to the caster wheels is transmitted through the arms to the top of the header to swing the same upwardly to overcome the force, rather than causing the header to buckle downwardly under as a result of the force application. The inwardly extending sections of the arms project through and beyond the corresponding sides of the header and are fixed to the latter, so as to preclude rotation, both at an outermost point on the side of the header and an innermost point spaced inwardly from the header side so that the innermost point of fixation augments the outermost point in precluding rotation of the inwardly extending arm sections as torsional stress is induced in the arms when the gauge wheels encounter rises in the terrain.

7 Claims, 1 Drawing Figure

U.S. Patent June 15, 1976 3,962,849
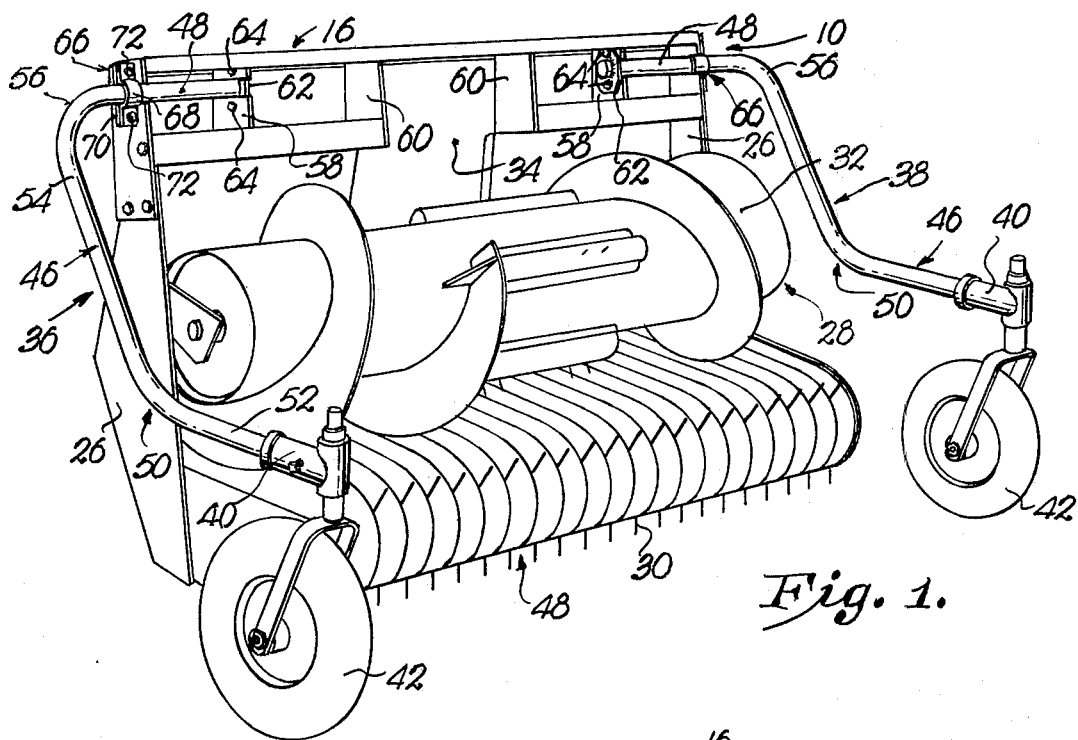
Fig. 1.
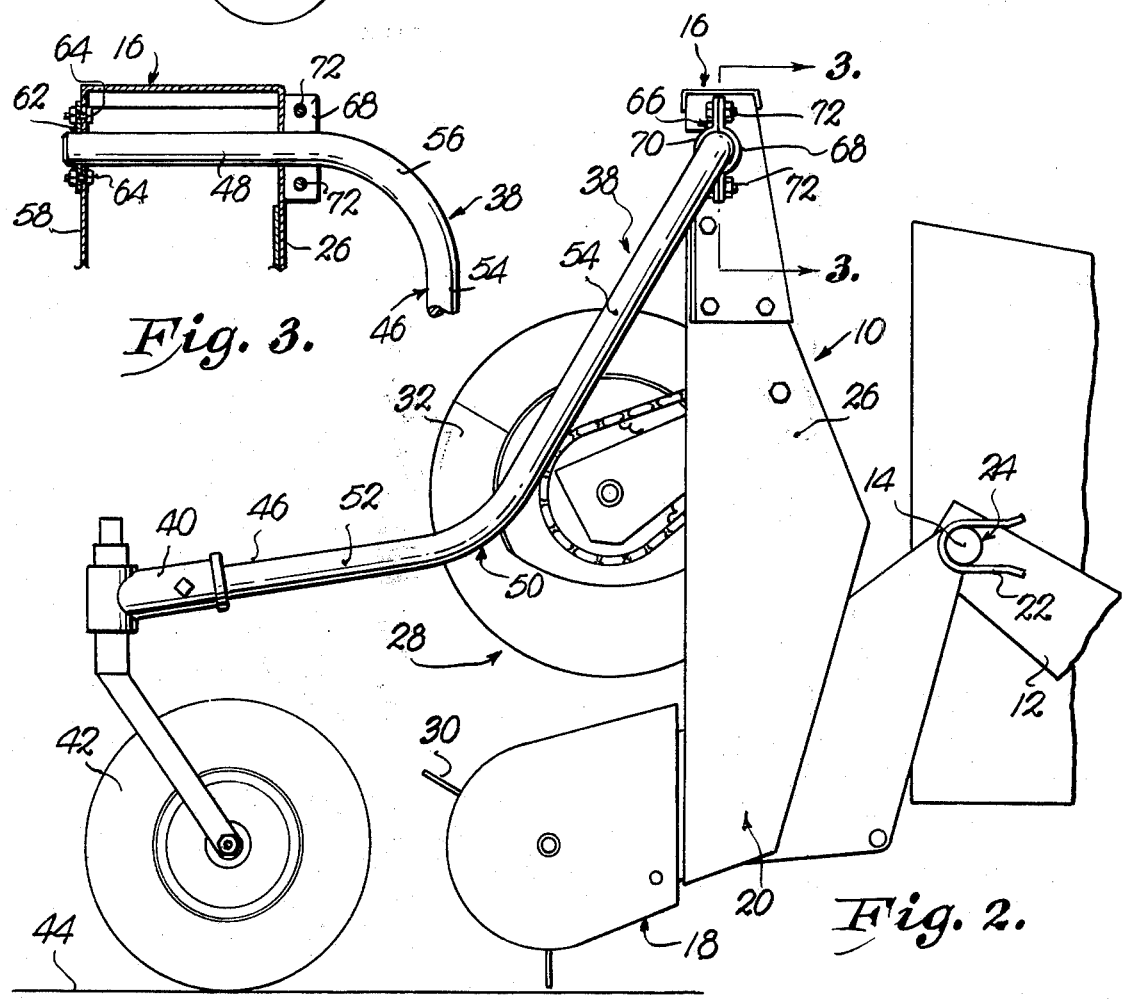
Fig. 3.
Fig. 2.

CASTER WHEEL ARM

This invention relates to supporting implement headers in the most advantageous manner to respond quickly and fully to changes in ground contour so that the header can always be maintained at a selected operating height relative to the ground, regardless of the changes in terrain that are encountered.

In the past many implement headers have employed gauge means in the form of skids that underlie the header and cooperate with a set of flotation springs to support the header as the machine is advanced across a field. However, such skids suffered from the disadvantage that they were not located sufficiently forwardly of the header to detect changes in ground contour early enough to raise or lower the header by an amount necessary to compensate for such rise or fall, thereby presenting instances in which the header would dig into the ground when a sharp rise was presented or lower on a delayed basis to the ground when a depression was encountered, inviting header damage and missed crops. Moreover, particularly in those situations where the radius of swinging movement of the header was relatively short, there was often a tendency for firm rearwardly directed forces against these skids to cause the header to buckle under the axis of swinging movement of the header rather than swing the header gently upwardly and over the obstruction generating the rearwardly directed force. This, of course, often happened quite abruptly and with considerable momentum in view of the speed of advancement of the machine and the mass of the header so that the latter would be slammed rearwardly against its main supporting frame as it buckled under, leading to appreciable damage.

Other arrangements have previously been developed which overcome some of the disadvantages of underlying gauge skids such as, for example, locating caster wheels substantially forwardly of the header which transmit changes in ground contour to the header to long, fore-and-aft extending arms. However, such arrangements did not solve the buckling under problems above set forth because the wheel support arms were attached to the header relatively close to the ground and spaced a substantial distance below the swinging axis of the header. Hence, rearwardly directed forces applied to the caster wheels were transmitted to the header below its axis to push the header downwardly and rearwardly, buckling it under, as a result.

The location at which the support arms of forwardly disposed caster wheels or the like are joined to the header is thus quite significant in determining whether or not the header will react in the desired manner to rises and falls in the terrain. In this regard, it has now been found that by locating the points of connection of the support arms adjacent the top of the header and spaced substantially above its swinging axis rather than adjacent the bottom of the header spaced substantially below such axis, force received by the gauge wheels or other ground engaging elements at the front of the support arms will be directed upwardly to the top of the header to instantaneously swing it upwardly and rearwardly to compensate for the obstruction, thereby preventing any tendency whatsoever for the header to buckle downwardly under its axis of swinging movement.

Accordingly, it is the primary object of the present invention to provide a gauging arrangement for the header of a farm implement, such as a forage harvester, so constructed and arranged that rearwardly directed forces encountered by the gauging means are transmitted to the header in a manner to swing the same quickly upwardly and over such rearwardly directed forces rather than causing the header to buckle downwardly and under its axis of swinging movement to slam against its main supporting frame.

Pursuant to the foregoing, it is a more specific object of this invention to attach the long, fore-and-aft extending arms which support the ground engaging elements of the gauging means to the header at a point adjacent its top, spaced substantially above its axis of swinging movement, thereby assuring that rearwardly directed force through the arms are received by the header above its axis of swinging movement rather than below the same.

An additional important object of this invention is to provide a unique way of affixing inwardly turned sections of the long arms to the header at a pair of spaced points along each inturned section so as to fully accommodate, without structural failure, any torsional stresses which may be induced in the long arms as they raise and lower the header when uneven terrain is encountered.

In the drawing:

FIG. 1 is a front perspective view of an implement header employing gauging means constructed and arranged in accordance with the principles of the present invention;

FIG. 2 is a side elevational view of the header and gauging means; and

FIG. 3 is a fragmentary cross sectional view taken along line 3—3 of FIG. 2 illustrating details of the manner in which the arms of the gauging means are fixed to the header.

The header 10 is swingably supported on the main frame 12 of the implement for vertical swinging movement about a horizontal axis 14 located approximately midway between the top 16 and bottom 18 of header 10. The axis 14 extends transversely to the normal path of travel of the implement and disposes header 10 for swinging movement forwardly of main frame 12 as the implement advances.

Header 10 is itself provided with a secondary frame denoted generally by the numeral 20, and such secondary frame 20 carries a pair of rearwardly opening yokes 22 (one only being shown) which receive a transverse pivot shaft 24 of main frame 12, the longitudinal axis of shaft 24 defining axis 14 of swinging movement of header 10.

Header frame 20 has a pair of opposed sides 26 extending between top 16 and bottom 18 thereof, and crop handling mechanism denoted broadly by the numeral 28 is supported by and located between sides 26. For purposes of illustration, the mechanism 28 is in the form of a windrow pickup of conventional design having tines 30 which sweep the windrowed crop upwardly and rearwardly to an auger 32 that gathers the crop centrally and discharges it rearwardly through opening 34 into further handling mechanism, such as a chopper (not shown), carried by main frame 12.

Header 10 is supported at least in part by gauging means in the form of a pair of generally fore-and-aft extending arms 36 and 38 that are spaced laterally outwardly from opposite sides 26 of header 10 and terminate in forwardmost free ends 40 located in front of header 10. The gauging means further includes a pair of caster wheel elements 42 located at said forwardmost ends 40 of arms 36 and 38, and wheels 42 are disposed to normally engage the ground surface 44. Although not shown, it is to be understood that one or more flotation springs is normally coupled with header 10 between the latter and main frame 12 to cooperate with caster wheels 42 in supporting the weight of header 10.

Each arm 36 and 38 includes a first generally upwardly and rearwardly extending section 46 that leads from its caster wheel 42 rearwardly to the header 10 and a second inwardly turned section 48 that connects the arms 36, 38 with frame 20 of header 10. Each first section 46 also has an upwardly opening crook 50 defined by legs 52 and 54 that diverge from crook 50, the forwardmost leg 52 extending forwardly from crook 50 in an essentially horizontal condition toward caster wheel 42 and the rearmost leg 54 extending upwardly and rearwardly from crook 50 at an incline toward the second section 48. A right angle elbow 56 at the rearmost ends of the arms 36, 38 integrally joins the fore-and-aft first sections 46 with the inwardly turned second sections 48.

Each inturned section 48 of arms 36, 38 extends inwardly through and beyond the corresponding side 26 of header 10 and terminates at an upstanding frame member 58 located approximately midway between the corresponding side 26 and a second upstanding frame member 60 that helps define opening 34. To each of these frame members 58 and to each side 26 is attached structure that fixes the corresponding inturned section 48 to frame 20 at two spaced locations along the length of inturned section 48. More specifically, the innermost end of each section 48 projects slightly through and is welded to a plate 62 that is in turn fastened through bolts 64 to the upright member 58. Secondly, that portion of each section 48 adjacent elbow 56 is fixed to the side 26 by a special outwardly projecting, two-part clamp 66, the latter having one part 68 complemental to the section 48 and welded to side 26 and a second part 70 which is also complemental to the section 48 but which is not welded to side 26. Instead, bolts 72 draw the second part 70 toward the welded part 68 and tightly clamp the underlying portion of section 48 between the two parts 68 and 70 such that the section 48 is completely held against rotation about its longitudinal axis relative to side 26. While the arms 36 and 38 might rise and fall to various extents during operation, there is no rotation of the sections 48 inwardly of elbows 56, and any torsional stress tending to be induced is taken up by the clamps 66 and by the augmenting fixed connections at member 58 by plates 62 and bolts 64.

It should be apparent from the foregoing detailed description that as the implement is advanced across a field, the caster wheels 42 sense rises and falls in the terrain an instant before the header 10, but such sensations are immediately directed upwardly and rearwardly through arms 36 and 38 to the top 16 of header 10. Thus, if the change in contour is simply a fall in the terrain, the header 10 will swing downwardly about axis 14 to the extent permitted by the caster wheels 42 as they remain in continuous contact with ground surface 44. If, on the other hand, the change in contour is an obstruction or a significant rise in the ground surface 44, the immediate reaction by header 10 is to rotate clockwise viewing FIG. 2 as the rearwardly directed forces in arms 36, 38 push top 16 around and above axis 14.

It is important to distinguish this type of header reaction to that which has historically been produced in headers where gauge arms are secured to the header close to the ground, substantially below the swinging axis of the header. In those situations, where a substantial rearwardly directed force was applied to the caster wheels or similar structure, the header had an immediate tendency to buckle downwardly and under the swinging axis of the header, such being in a counter-clockwise direction as FIG. 2 of the present drawing is viewed. Hence, the pickup tines on such earlier equipment could be quite easily broken as the header dug deeply into the ground surface and, more importantly, the header should be slammed violently against its main supporting frame, resulting in substantial damage and resultant down time to repair the damage.

Thus, with respect to buckling under, the "high mount" arrangement of the present invention solves a serious problem of longstanding in this art and does so without resorting to complex and costly apparatus that invites frequent malfunction and repair.

Moreover, with respect to torsional stresses induced in long support arms having right angle elbows, the "two-point" attachment principle of the present invention wherein sections 48 are fixed to header 10 not only at sides 26 but at members 58 as well also represent a significant advance in this field without undue cost and complications.

Having thus described the invention, what is claimed as new and desired to be secured by Letters Patent is:

1. In an implement having a mobile main frame and a crop header mounted on said frame forwardly of the latter for vertical swinging movement about a horizontal axis extending transversely of the normal path of advancement of the frame, said header having a top, a bottom, and a pair of opposed sides, gauge means for swinging the header about said axis relative to the frame in response to encountering uneven terrain, said gauge means including:

a pair of elongated, generally fore-and-aft extending arms spaced outwardly from said opposite sides of the header and terminating in forwardmost free ends forwardly of the header;

a ground engaging element on each of said arms respectively at said fowardmost ends thereof for detecting rises and falls in the terrain in front of the header, each of said arms including a first section extending generally upwardly and rearwardly from its ground engaging element toward the header and a second section extending transversely inwardly from the upper rear end of the first section toward the corresponding side of the header; and structure securing said second section of each arm respectively to the header adjacent said top of the latter and spaced substantially above said axis vertically remote therefrom to prevent buckling under of the header in response to the application of a rearwardly directed force to said elements.

2. In an implement as claimed in claim 1, wherein said first section of each arm is provided with an upwardly opening crook spaced ahead of said second section of the arm.

3. In an implement as claimed in claim 2, wherein said first section of each arm includes a pair of legs diverging from said crook, the forwardmost of said legs extending generally horizontally from the crook toward the corresponding element on the arm and the rearmost of said legs being inclined upwardly and rearwardly from the crook toward the second section of the arm.

4. In an implement as claimed in claim 1, wherein said second section of each arm extends inwardly through and beyond the corresponding side of the header, said structure including first means fixing each second section respectively to its header side at a first point to preclude rotation of the second section relative to the corresponding header side and second means spaced inwardly from said first means and fixing each second section respectively to the header at a second point to augment the anti-rotation action of said first means.

5. In an implement as claimed in claim 4, wherein said first fixing means for each arm includes a clamp projecting outwardly from the corresponding side of the header, each clamp having one part fixed to the proximal header side and another part in opposition to the one part and shiftable toward and away from the same, said second arm section being disposed between said parts, each clamp further including means drawing said other part toward said one part to tightly grip the second arm section therebetween.

6. In an implement as claimed in claim 4, wherein said second fixing means for each arm includes a welded union with the header.

7. In an implement as claimed in claim 1, wherein each of said elements comprises a ground wheel.

* * * * *